US011904716B2

(12) United States Patent
Rezvani et al.

(10) Patent No.: US 11,904,716 B2
(45) Date of Patent: Feb. 20, 2024

(54) BASE STATION-LESS DRONES

(71) Applicant: Alarm.com Incorporated, Tysons, VA (US)

(72) Inventors: Babak Rezvani, St Petersburg, FL (US); Ahmad Seyfi, Reston, VA (US); Glenn Tournier, Vienna, VA (US); Donald Gerard Madden, Columbia, MD (US)

(73) Assignee: Alarm.com Incorporated, Tysons, VA (US)

( * ) Notice: Subject to any disclaimer, the term of this patent is extended or adjusted under 35 U.S.C. 154(b) by 417 days.

(21) Appl. No.: 17/199,932

(22) Filed: Mar. 12, 2021

(65) Prior Publication Data

US 2021/0284037 A1 Sep. 16, 2021

Related U.S. Application Data

(60) Provisional application No. 62/988,941, filed on Mar. 13, 2020.

(51) Int. Cl.
*B60L 53/37* (2019.01)
*G06F 3/06* (2006.01)
*H02J 7/00* (2006.01)
*B60L 53/18* (2019.01)
*B60L 58/12* (2019.01)
(Continued)

(52) U.S. Cl.
CPC ............... *B60L 53/37* (2019.02); *B60L 53/12* (2019.02); *B60L 53/18* (2019.02); *B60L 53/66* (2019.02); *B60L 58/12* (2019.02); *B64F 1/362* (2013.01); *G01C 21/20* (2013.01); *G06F 3/0604* (2013.01); *G06F 3/0659* (2013.01);

*G06F 3/0673* (2013.01); *G06V 20/176* (2022.01); *H02J 7/0048* (2020.01); *B60L 2200/10* (2013.01)

(58) Field of Classification Search
CPC .......... B60L 53/37; B60L 53/12; B60L 53/66; B60L 53/18; B60L 58/12; B60L 2200/10; H02J 7/0048; G06V 20/176; B64F 1/362; G01C 21/20; G06F 3/0604; G06F 3/0659; G06F 3/0673
USPC ....................................................... 348/117
See application file for complete search history.

(56) References Cited

U.S. PATENT DOCUMENTS

2018/0281945 A1* 10/2018 Needham ............... H02N 2/186
2021/0080932 A1* 3/2021 Gorsica .................... H02J 50/10

FOREIGN PATENT DOCUMENTS

KR 101679823 B1 * 11/2016 ............... H02J 7/025

OTHER PUBLICATIONS

Bogel et al., Drones for Inspection of Overhead Power Lines with Recharge Function, Aug. 28, 2020, https://ieeexplore.ieee.org/document/9217835 (Year: 2020).*

* cited by examiner

*Primary Examiner* — James E Springer
(74) *Attorney, Agent, or Firm* — Fish & Richardson P.C.

(57) ABSTRACT

Methods, systems, and apparatus, including computer programs encoded on computer-storage media, for drones. In some implementations, a method may include obtaining an image of an electrical device; determining a power source of the electrical device based on the image of the electrical device; determining whether the power source of the electrical device is capable of charging a drone based on the image of the electrical device; and based on determining that the power source of the electrical device is capable of (Continued)

charging the drone based on the image of the electrical device, charging the drone with the power source.

19 Claims, 5 Drawing Sheets

(51) Int. Cl.
    *B60L 53/66*     (2019.01)
    *B60L 53/12*     (2019.01)
    *B64F 1/36*     (2017.01)
    *G01C 21/20*     (2006.01)
    *G06V 20/10*     (2022.01)

BASE STATION-LESS DRONES

CROSS-REFERENCE TO RELATED APPLICATION

This application claims the benefit of U.S. Provisional Application No. 62/988,941, filed on Mar. 13, 2020, the contents of which are incorporated by reference herein in its entirety.

BACKGROUND

Many properties are equipped with monitoring systems that include sensors and connected system components.

SUMMARY

Techniques are described for a base station-less drone capable of detecting and connecting to existing sources of power within a property. Sources of power can include outlets, current carrying wires, or other sources of energy (e.g., sunlight through a room window). A drone capable of landing safely and recharging in multiple, non-dedicated locations around a property can both extend the operational range and reliability of the drone without additional cost or effort on the part of the user or installer.

The drone can use onboard sensors or recall locations from memory to find sources of power on a property. The drone can identify one or more power source candidates either through direct detection, while on patrol or completing a mission, or indirectly through data stored on a connected device. In some cases, a drone can receive information on power sources from a central server or control unit.

In finding the location of a power source using onboard sensors, the drone can use a camera to capture images of a room within a property. Images of the room can be analyzed, either on board the drone or by an external system communicating with the drone, to identify available power sources including open power outlets. The use of one or more power sources on a property can be governed by system rules which can be configurable. For example, a user may configure a rule to prevent the use of outlets in a room as power sources when at least one person is in the room. Subsequent sensor detections can be made, in part, to inform whether or not a given power source is open based on any existing rules.

The drone can map the locations of sources of power in the property. In some implementations, the drone can also monitor the availability as well as efficacy of the sources of power over time to inform navigation or charging decisions. The locations of power sources in the property can be used to enable a drone to favor routes which allow it to arrive or be in close proximity to one or more of the locations of power sources.

The drone can determine which power source to connect to based on environmental factors, internal logic, or external instruction (e.g., user input, control unit input, etc.). The drone can identify a power source on a property and be able to land and receive power. In some implementations, the drone can land on a wall with the help of on board attachments. For example, suction cups or friction increasing pads on the legs or body of the drone can help keep the drone in place while receiving power from an outlet. The drone can use onboard sensors, such as accelerometers, or visual data, to determine whether or not the current situation is stable. If the current situation is determined to be stable, the drone can power down parts of the system which can include propellers, motorized stabilizers, or parts of the operating system.

In some implementations, the drone remains in a low power state while receiving power from a power source.

In one aspect, the disclosure provides a method including obtaining an image of an electrical device; determining a power source of the electrical device based on the image of the electrical device; determining whether the power source of the electrical device is capable of charging a drone based on the image of the electrical device; and based on determining that the power source of the electrical device is capable of charging the drone based on the image of the electrical device, charging the drone with the power source.

In some implementations, the method further includes obtaining information of the electrical device including a power output of the power source of the electrical device, where determining that the power source of the electrical device is capable of charging the drone includes determining the power output of the power source of the electrical device satisfies a power requirement for charging the drone.

In some implementations, the method further includes determining a current charge level of the drone is below a predetermined charge level; and in response to determining the current charge level of the drone is below the predetermined charge level, obtaining information of the electrical device.

In some implementations, the information of the electrical device includes a location of the electrical device.

In some implementations, the method further includes in response to determining the power source of the electrical device, storing information corresponding to the power source in data storage; after storing the information corresponding to the power source in the data storage, determining a current charge level of the drone is below a predetermined charge level; in response to determining the current charge level of the drone is below the predetermined charge level, obtaining the information corresponding to the power source from the data storage; and charging the drone with the power source based on the information corresponding to the power source stored in the data storage.

In some implementations, before charging the drone with the power source, the method further includes obtaining a second image of the power source of the electrical device; and determining, based on the second image of the power source, the power source is available.

In some implementations, the method further includes generating a power source candidate list that includes the power source; receiving information that indicates an alarm condition of a property, where the property includes the electrical device; and updating the power source candidate list based on the alarm condition.

In some implementations, determining that the power source of the electrical device is capable of charging the drone includes: determining whether the power source of the electrical device is available; and based on determining the power source of the electrical device is available, determining that the power source of the electrical device is capable of charging the drone.

In some implementations, determining that the power source of the electrical device is capable of charging the drone includes: determining a charging mechanism of the drone is compatible with the power source of the electrical device.

In some implementations, the electrical device is a user device and the method further includes: obtaining information of the power source including charging data obtained from the user device, where the charging data indicates a location of the power source used for charging the user device.

In some implementations, the method further includes: determining another power source as a second power source; determining a first set of priority factors for the power source; determining a second set of priority factors for the second power source; based on the first set of priority factors and the second set of priority factors, generating a first priority factor for the power source and a second priority factor for the second power source; and charging the drone with the power source based on a comparison of the first priority factor and the second priority factor.

In some implementations, the method further includes: determining a route plan based on a location corresponding to the power source.

In some implementations, the method further includes: storing information of the power source, where the information of the power source includes a position of the drone when charging with the power source.

In some implementations, the method further includes: obtaining a power schedule for one or more electrical devices of a property, where the one or more electrical devices include the electrical device; and determining that the power source of the electrical device is capable of charging the drone based on the power schedule for the one or more electrical devices.

In some implementations, charging the drone with the power source includes: charging the drone by induction from electrical charges moving in a power cable of the electrical device, where the power cable of the electrical device is the power source of the electrical device.

In some implementations, the method further includes: providing a list of power source candidates to a user device, where the list of power source candidates includes information of the power source; receiving data corresponding to the information of the power source from the user device; and based on receiving the data, charging the drone with the power source.

In some implementations, the method further includes: providing a list of power source candidates to a user device at a first time, where the list of power source candidates includes information of the power source; obtaining a timeout period, where the timeout period is an amount of time; determining that an amount of time from the first time to a current time satisfies the timeout period; and based on determining that the amount of time from the first time to the current time satisfies the timeout period, charging the drone with the power source.

In some implementations, the method further includes: providing a list of power source candidates to an external database, where the list of power source candidates includes information of the power source.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
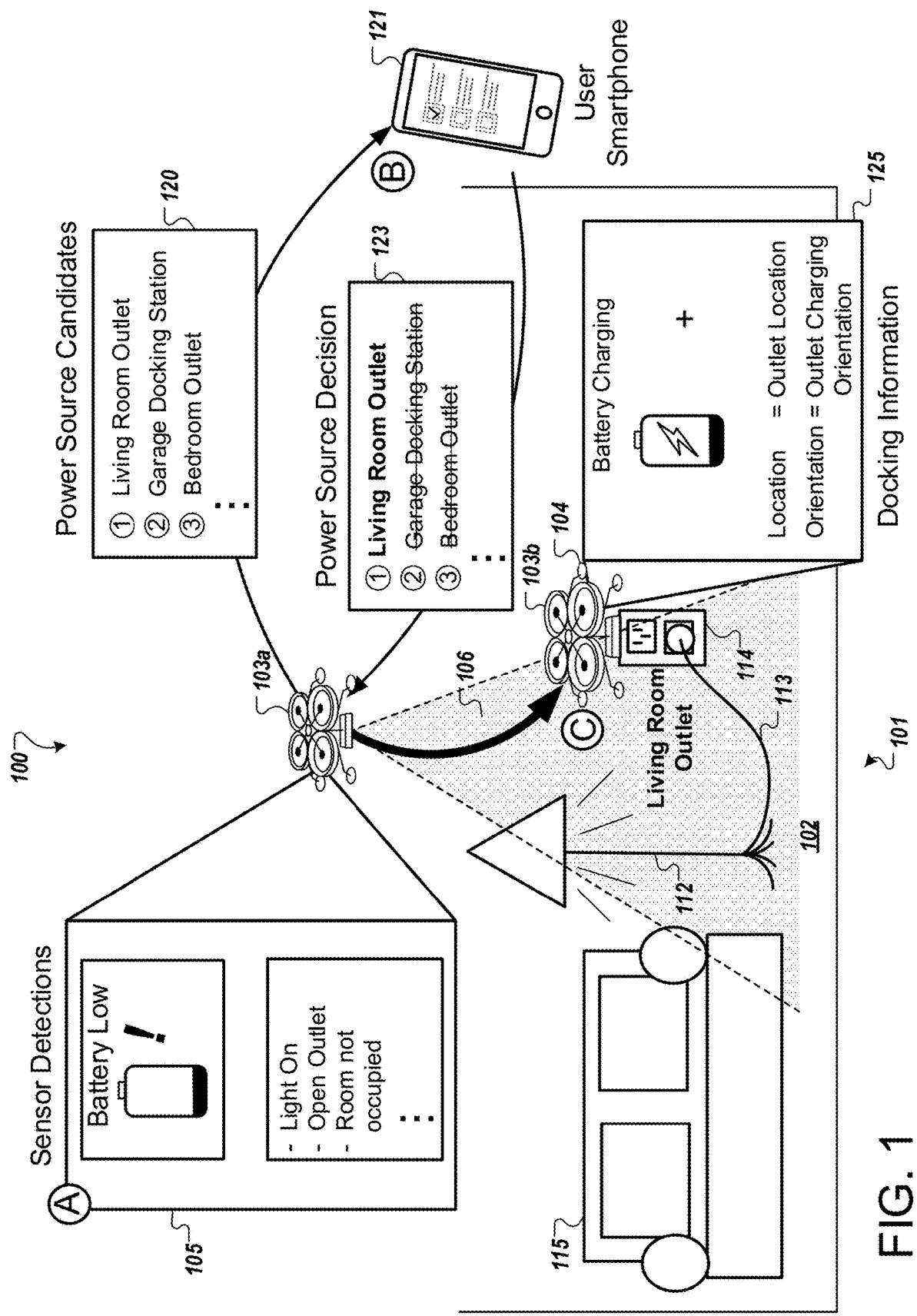
FIG. 1 is a diagram showing an example of a system that includes a base station-less drone.

FIG. 1 is a diagram showing an example of a system 100 that includes a base station-less drone. The system 100 includes a property 101, a living room 102 within the property 101, a drone 103a and 103b, a lamp 112, a power cable 113 connecting the lamp 112 to a living room outlet 114, the living room outlet 114, a couch 115, and a user smartphone 121. The drone 103a and the drone 103b both refer to one instance of a drone which is referred to as drone 103. The drone 103 is represented at one time as the drone 103a and a later time, in a different location, as the drone 103b. The drone 103 is a quad-copter drone with flying capabilities. The drone 103 is equipped with visual sensors which can detect elements of its surroundings, a battery which can be charged with an electric current, an accelerometer, and legs with suction cups 104 attached that can be used while at a power source (e.g., power outlet, wireless charger, power cord, etc.).

In stage A of FIG. 1, the drone 103a detects that its battery is low. A battery low detection prompts further sensor detections. The visual sensors onboard the drone 103a at a particular time have a field of view 106. The drone 103a detects elements within the field of view 106 including the lamp 112, the living room outlet 114, and the power cord 113 that connects the lamp 112 to the living room outlet 114. The drone 103a detects light coming from the lamp 112. Based on the detections that the lamp 112 is producing light and connected to the living room outlet 114, the drone 103a determines that the lamp 112 is drawing power from the living room outlet 114. The drone 103a uses visual analysis to detect that the top socket of the living room outlet 114 is open. In this example, the system 100 contains a restriction that the drone 103a cannot use a power source within a room if any person is in the room. The drone 103a uses further visual analysis to detect that the living room 102 is not occupied and so, use of the living room outlet 114 power source is not restricted.

In some implementations, a power source may be turned on by an automated system. For example, the drone 103a can detect that the lamp 112 is not producing light but is connected to the living room outlet 114. In response to detecting that the lamp 112 is not producing light but is connected to the living room outlet, the drone 103a, or another component of the system 100, can determine that the living room outlet 114 is not currently providing power. In response to determining that the living room outlet 114 is not providing power, the drone 103a, or another component of the system 100, can generate a request for the living room outlet 114 to be turned on by an automated system and send the request to a component of the automated system, such as a control unit of the system 100 that is communicably connected to one or more components, including the living room outlet 114, of the property 101. The living room outlet 114 can be turned on by the control unit based on the request for the living room outlet 114 to be turned on or by a signal sent directly from the drone 103a.

In some implementations, a power source may be turned on by an automated system for a predetermined amount of time. For example, an automated system, such as a control unit of the system 100, can determine a charging time for the drone 103a and turn on a power source to be used for charging the drone 103a such that the power source is powered for a duration corresponding to the charging time. In this way, a property can potentially reduce electricity usage. For example, as shown in FIG. 1, if an automated system provides power to the living room outlet 114 only when the drone 103a needs to be charged, the system 100 can save electricity that would typically be used by the lamp 112.

In some implementations, a power source may be turned on by an automated system in response to one or more requirements being satisfied. For example, an automated system can turn on the living room outlet 114 if no one is in the living room 102 and a socket is available to charge the drone 103a. In this way, occupants of a property are not disturbed by the drone 103a or the lamp 112 turning on. In another example, an automated system, such as a control unit of the system 100 or another connected component including the drone 103a, may determine the lamp 112 is off and therefore the living room outlet 114 is not available for charging. If the determination is made by the drone 103a, the drone 103a can either directly turn on the living room outlet 114, after checking corresponding system requirements for turning on the living room outlet 114, or send a request for another component, such as a control unit of the system 100, to turn on the living room outlet 114.

In some implementations, other connected components can check system requirements to determine whether to turn on a given power source or to deny a request. For example, a control unit of the system 100 or the drone 103a can determine whether to turn on the living room outlet 114 or to deny the request based on one or more system requirements. System requirements can vary from system to system and can be programmable by a user but may include one or more of the following: (i) obtaining a schedule to determine if a current time is within a period corresponding to an allowed powering or charging time or a projected end time of charging is within the period corresponding to the allowed powering or charging time, (ii) determining a given power source is capable of charging a given device, such as determining a socket of the living room outlet 114 is open, (iii) determining that no person is or will be disturbed by the charging or powering on process, such as determining that no person is currently occupying or will occupy the living room 102 when the living room outlet 114 is turned on or while the living room outlet 114 is on to charge the drone 103a.

In some implementations, a power source may be turned on by an automated system in response to determining no alternative power source is available. For example, if an alternative power source, such as a second outlet with a powered and open socket, exists in the living room 102, a component of the system 100, such as a control unit of the system 100, can deny a request to power on the living room outlet 114 based on the second outlet already being able to provide charge to the drone 103a. In this way, power sources currently available can be prioritized over turning on power sources that are currently off. In some cases, prioritizing power sources already on can conserve electricity at a property as well as reduce operating expenses. Alternatively, the drone 103a, or a connected component, can determine that the second outlet has a powered and open socket and can directly determine to charge with the second outlet without generating or sending a request for the living room outlet 114 to be powered on.

By combining sensor detections, including detections which determine the lamp 112 is powered, the living room outlet 114 has an open top socket, and the room is not occupied, the drone 103a determines that the living room outlet 114 is a power source candidate. The living room outlet 114 can be added to a list of power source candidates 120 stored within a data storage device onboard the drone 103a. The living room outlet 114 is favored over two other confirmed power sources: a garage docking station and a bedroom outlet. In this example, the living room outlet 114 is favored because it is closer to the drone 103a than the two other confirmed power sources. The garage docking station and the bedroom outlet are power sources which have been detected prior.

In stage B of FIG. 1, the drone 103a sends the list of power source candidates 120 to the user smartphone 121. The user smartphone 121 receives the list of power source candidates 120 and presents the options to a user by displaying the options on a screen of the user smartphone 121. The user chooses the living room outlet 114. The smartphone 121 sends the decision of the user as data 123 to the drone 103a.

In some implementations, the drone 103a does not send a power source candidate list. For example, the drone 103a can choose a best power source candidate from a list based on internal logic or communication with a control unit.

In stage C of FIG. 1, the drone 103a moves to the living room outlet 114 power source. The new location of the drone 103 is represented by the drone 103b. The drone 103b affixes itself to the wall by attaching the suction cups 104 to the wall above the living room outlet 114. The drone 103b uses an accelerometer onboard to detect any slipping of the suction cups 104. After the accelerometer onboard detects no slipping of the suction cups 104, the drone 103b uses a plug to connect to the living room outlet 114. After connected to the living room outlet 114, the drone 103b begins charging its battery. The drone 103b also updates its location based on the known location of the outlet by accessing the known location of the outlet stored on a connected server. The drone 103b also updates its orientation based on the known orientation of a drone that is connected to the living room outlet 114. The drone 103b updates its location and orientation based on information determined from internal mapping of the living room 102 and position of the living room outlet 114 in relation to the living room 102. The drone 103b activates onboard visual sensors to detect for any person in the living room 102.

In some implementations, magnetic attraction can be used to affix the drone 103b to the wall. For example, a magnetic attachment on the drone 103b can find a stud near to the living room outlet 114 on the wall. The magnetic attraction between the magnetic attachment on the drone 103b and the stud can be sufficient to hold the weight of the drone 103b and allow the drone 103b to enter a low power state.

In some implementations, the drone 103b can use other methods to stabilize itself before connecting to a power source. For example, the drone 103b can rotate and place its legs on a floor below the living room outlet 114. The friction between the legs and the floor below the outlet 114 can stabilize the drone 103b as it draws power from the outlet 114. For another example, the drone 103b can be equipped with one or more pads, either on the legs of the drone similar to suction cups 104 or on the belly of the drone. The one or more pads can be pressed against the wall to increase the static coefficient of friction between the wall and the drone. The friction between the wall and drone can stabilize the drone 103b as it draws power from the outlet 114.

In some implementations, a probe may be used by the drone 103b to create a firm mechanical connection. For example, a probe onboard the drone 103b can be inserted into the ground receptacle of an outlet. The probe can then create a firm mechanical connection (e.g. expand, apply pressure to the inner walls of the ground receptacle of the outlet, etc.). The drone 103b can then use the firm mechanical connection to push power prongs into the positive and negative receptacles of the outlet. The drone 103b could be sufficiently supported by the outlet to enable one or more features (e.g. propellers, onboard computers, etc.) to power down. Powering down one or more features may enable increased charging speed or efficiency.

In some implementations, the drone 103b can connect to other devices on the property 101 to help determine relevant actions. For example, the drone 103b can communicate with a control unit that is connected to a surveillance camera watching the door leading to the living room 102. If the control unit determines that a person is about to enter the living room 102, the control unit can send a signal to the drone 103b that a person is about to enter the living room 102. In the case of FIG. 1, a restriction is in place that restricts the use of power sources in a room while a person is in the room. Based on this restriction, the drone could use the signal that a person is about to enter the living room to re-locate to a different power source or location before the person enters the living room 102.

In some implementations, the drone 103a can send the power source candidate list to another device. For example, based on user preferences, the drone 103a can send the list of power source candidates 120 to a laptop. In general, any electronic device can be programmed to receive updates from the drone 103a.

In some implementations, a time out period can allow the drone 103a to decide which power source to use without receiving feedback from the user. For example, if the drone 103a sends the power source candidate list 120 to the user smartphone and does not receive a response within thirty seconds, the drone 103a can move to the power source of its own determination. In general, the drone 103a can choose a power source which is available, nearby, and is not subject to any active restrictions (e.g., not flying to bedroom outlets when a user is likely sleeping). Depending on implementation, this can be the first option within a list of power source candidates.

In some implementations, the drone 103a can store the list of power source candidates remotely. For example, an online database for the property 101 can contain a list of power source candidates. The drone 103a can, instead of adding the living room outlet 114 to a data storage device onboard, upload details of the living room outlet 114 to the online database for the property 101. The online database for the property 101 can be accessed by using any suitable signal (e.g., Wi-Fi, Bluetooth, etc.).

In some implementations, the detections of particular elements within the field of view 106 can be a result of a heuristic form of learning or visual analysis. For example, machine learning can be used to train software on the drone 103a to recognize the living room outlet 114. This learning can be tuned based on elements of a property. For example, a socket in France can look different than a socket in the United States. The machine learning process can train the software to recognize outlets from different countries. Alternatively, the appearance of a type of socket or outlet can be stored within a drone to aid in detection. For example, images captured from a room in the United States can be compared with images of one or more sockets from the United States. By visually analyzing and comparing the sets of images, a drone can determine if a specific object is an outlet. Furthermore, specific key features of an element, such as the rectangular shape and symmetric holes of a power outlet, can be analyzed for to determine elements of a property.

In some implementations, power sources can be added without a low battery detection. For example, the drone 103a can detect the lamp 112, the living room outlet 114 and the cord connecting the lamp 112 to the living room outlet 114. The drone 103a can make a determination that the living room outlet 114 is a possible power source and add it to a list of power source candidates. At a later time, the drone 103a can detect that its battery is low and a power source is required. The drone 103a can use further detections to determine if the living room outlet 114 is available and if it is, it may choose to navigate to the living room outlet 114 and recharge. Elements on a property can be detected during a patrol or during other missions of a device or drone.

In some implementations, processes related to aspects of the drone can be performed by an external system. For example, the visual analysis used to detect elements within the field of view of visual sensors onboard the drone 103a can be performed by an external server. The drone 103a can capture images within the field of view 106. The drone 103a can send the captured images to a control unit. The control unit can then run visual analysis on the captured images and send data back to the drone 103a.

In some implementations, a drone in a system may use other components in the system to know the status of a particular power source. In some cases, the drone may know the status of the particular power source without visiting the particular power source. Video analysis can be performed on video feed of another drone or a fixed camera in the system. For example, a camera in a room may be used to capture video feed that includes images of a lamp. The video feed can be analyzed to inform charging decisions including adding or removing items from the source candidates list. For example, the feed from the camera could be analyzed by a processor. The processor can use image recognition or another method to detect a lamp that is illuminated and plugged into an outlet. The analysis of the processor can be used to add the outlet that the lamp is plugged into, or the cord connecting the outlet to the lamp, to a source candidate list. The feed could also be analyzed to give updates to the system or a particular component of the system (e.g., drone, power source, etc.) on whether the lamp is on or off, if the cord is blocked by a temporary object, if people are in the room, or other data within the video feed.

In some implementations, another element of the system 100 can update the power source candidates list. For example, an alarm system can be switched from an unarmed state to an armed state on the property 101. The power source candidate list before the arming of the alarm system contained a power source which is in the backyard of the property 101. A restriction of the system 100 can limit use of outdoor power sources while the alarm system is armed. As a result, a control unit or a central server of system 100 can remove the power source in the backyard of the property from the power source candidate list when the alarm system is switched from an unarmed state to an armed state.

In some implementations, the drone 103a can use other sensors to detect a power source. For example, RF sensors onboard the drone 103a can be used to triangulate the position of a possible power source. The drone 103a can use infrared cameras to detect power sources at night. In general, the drone 103a can use any onboard device to receive signals from the environment and use those signals to locate possible power sources.

For each power source in a list of power source candidates, information relevant to locating and using the power source can be stored under the same reference. In general, this can include location, power output, availability, or restrictions. In some implementations, the drone 103a can use information from another device to inform relevant actions. For example, the drone 103a can find a nearby active power sources by comparing its location with the location of power sources within the property 101. The drone 103a can use relevant information to determine if the power source is available. For example, a power source can be available if no other device is using it, no restrictions are in place (e.g., a person is out of the room if a restriction forbids use of a power source with a person in the room, no restriction is currently set, etc.), the drone 103a is of a size or type to be able to draw power from the power source (e.g., the power source provides the correct power output for the drone 103a, the drone 103a has the correct connections to connect to the power source, the power source is in a location in which the drone 103a can reach, etc.), or the power source is currently able to output power.

In some implementations, a device operating within a property can have a different power source candidate list than another device operating within the property. For example, a large drone can require 45 volts of power to charge its battery. A smaller drone can require 10 volts of power to charge its battery. The power source candidate list for the smaller drone contains a 5 volt phone charger. The power source list for the large drone may not contain the 5 volt phone charger.

In some implementations, the system 100 may use requirements to ensure compatibility between a drone and a given power source. For example, a first drone may be able to connect and charge using 110V AC power sources while a second drone may not. The first drone may be able to inductively charge from a charging pad while a second drone may not. The first drone may be able to connect to power using a universal serial bus (USB) type C port while the second drone may only be able to connect to power using a USB type A port. The requirements may involve checking the abilities of a drone where the abilities may include hardware as well as software features.

In some implementations, the requirements may also involve checking the power output of a given power source. For example, a small drone's charging circuitry might only need 5-10 watts while the larger drone might prefer 45 watts for optimal charging. In some cases, physical requirements (e.g., height, clearance, etc.) of the power source may be met. For example, a small drone may only need 10 centimeters on each side of an outlet to be able to navigate to the outlet and connect while a larger drone would need more free space. A flying drone may be able to reach an outlet at any height while a ground robot may only be able to reach 24 inches off the floor. Based on the configurations of a robot or drone and the configurations of the power source and surrounding environment, compatibility can be determined. In some cases, compatibility can be determined by a component of the system (e.g., drone, control unit, etc.) or by an external computer connected to the system. Compatibility may be used to inform the candidate source list or other factors related to charging or docking.

Figure 2:
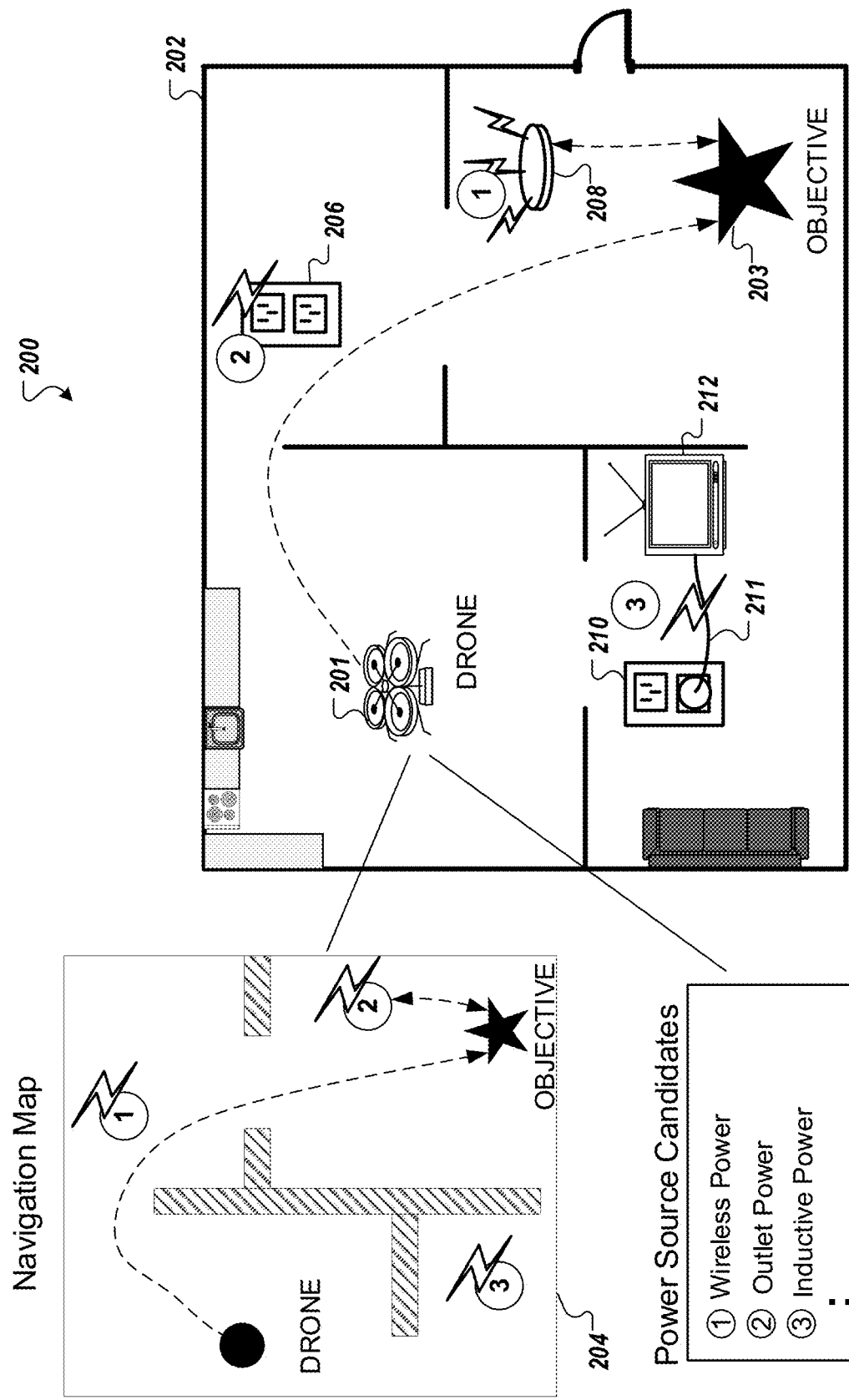
FIG. 2 is a diagram showing an example of route planning.

FIG. 2 shows an example of a system 200 capable of route planning. The system 200 includes a drone 201, a property 202, an objective 203, a navigation map 204, a power source candidate list 205, an outlet power source 206, a wireless charger power source 208, and an inductive charging power source 211 that is composed of a power cable connecting an outlet 210 to a television 212. The drone 201 is capable of moving around the property 202. The navigation map 204 is stored onboard the drone 201. The power source candidate list 205 is also stored onboard the drone 201. The navigation map 204 shows the drone, power sources 206, 208, and 211, barriers or walls, a projected route from the location of the drone 201 to the location of the objective 203 and a projected route from the location of the objective 203 to the location of the power source 208.

The outlet power source 206 is an outlet with at least one open socket that is connected to power and not actively under a restriction. The drone 201 can use the outlet power source 206 in a manner similar to the system 100 in FIG. 1. In particular, the drone 103b and the living room outlet 114.

The wireless charger power source 208 is a form of mobile device charger available to the drone 201. The drone 201 uses data captured from the system 200 to detect aspects of the wireless charger power source 208. In this example, the drone 201 captures data from a smartphone of a user of the property 202. Installed on the smartphone is an application which can store certain activities related to use of the smartphone. For example, the application can store when the smartphone is being charged. The application can capture sensor information (e.g., pictures, videos, location information, etc.) before, during, or after the smartphone has been charged. Information from the smartphone is used by the drone 201 to detect a power source.

The inductive charging power source 211 is a power cable connecting an outlet 210 to a television 212. The power cable 211 transfers power from the outlet 210 and offers an opportunity for the drone 201 to charge its batteries by using induction. Instead of using a plug, the drone 201 can use a copper coil to transform the moving charge in the power cable 211 into moving charge capable of charging batteries. The drone 201 detects the current used in the power cable 211 is sufficient to charge one or more batteries of the drone 201.

The power sources including the outlet power source 206, the wireless charger 208, and the inductive charger 211 are prioritized based on factors within the system 200. In the example shown, the wattage of the cable 211, which offers charge through induction, is small and would require a long charging time for the drone 201. The inductive charger 211 is subsequently of a relatively low priority. The numbers in item 205, which match the numbers shown in the diagram for the property 202, indicate the relative priority of the power sources. The outlet power source 206 is available and not restricted and would offer a quicker charge compared to the inductive charger 211. For this reason it is placed at a higher priority than the inductive charger 211. The wireless charger 208 is available, not restricted, and nearby a current objective for the drone 201. The wireless charger 208 is subsequently of the highest priority, currently.

In some implementations, the system 200 can rank power sources. For example, the system 200 can model how long it will take a particular drone to navigate to a power source, charge at the power source, and return to a current mission. Multiple calculations for multiple power sources can be used to establish ranking for the multiple power sources. In some cases, the charging at a particular power source may take longer but the particular power source happens to be in a location where a drone, once docked and charging at the particular power source, can effectively surveil an area while charging. In some cases, the area to be surveilled may also impact the ranking. For example, an entryway with high traffic is more useful to surveil than an unused guest bedroom. In this case, an opportunity to surveil the entryway would improve the ranking of a particular power source more than a similar power source offering an opportunity to surveil an unused guest bedroom.

The drone 201 forms elements of the navigation map 204 by using sensors onboard. The drone 201 includes a camera and a microphone. In general, any device capable of moving with the drone 201 can be included onboard as a sensor. The camera captures elements of the property 202 represented in item 204. The walls or barriers of the property are translated by capturing images of the property 202 and analyzing the captured images. The microphone is used to detect users within a room or other environmental sounds (e.g., door opening, telephone ringing, alarm, etc.).

The drone 201 uses the stored location of elements within the property 202 within a navigation map 204 to determine a route to the objective 203. Locations of power sources are used in route planning. The drone 201 chooses the route to the objective 203 that allows the drone 201 to be in close proximity to an available power source 208. The drone 201 plans a route from the objective 203 to the power source 208.

In some implementations, other connected devices on the property 202 can be used to aid in the use of a power source. For example, a drone can navigate to a window in order to charge one or more of its batteries using solar cells installed on its body. If the window is shaded, the drone can communicate to a connected window blind or curtain to open and let in sunlight. The sunlight can be used to activate the solar cells and charge the one or more batteries of the drone.

In some implementations, another device operating within the property 202 can inform the actions of the drone 201. For example, another drone can be patrolling the property 202 and detect a power source. Relevant information about the power source can be stored in a shared network location that can be accessed by the drone 201. In some cases, the other drone can directly send the information to the drone 201.

In some implementations, data captured from sources such as the smartphone of a user of the property 202 can be processed by other devices of the system 200. For example, a central server or control unit can determine power sources and push the results to a drone within a system.

In some implementations, other forms of sensors can be used to detect elements of a navigation map. For example, infrared sensors can be used onboard a drone to detect walls. This can be advantageous in a situation where there is not sufficient visible light. Infrared radiation can be can be used to detect features.

In some implementations, power sources that are not currently candidates can be stored or part of navigation planning. For example, a power source that is not a member of the power source candidate list 205 can be represented in the navigation map 204. This can be advantageous in a situation where restrictions would prevent a power source from being a candidate but restrictions could be lifted or overridden in a given situation (e.g., emergency, alarm triggered, rule change, etc.).

In some implementations, elements of the navigation map 204 are informed by a control unit or central server. For example, a control unit can store blueprints and locations of power sources. The control unit can send data to a drone. The drone can use the data to aid in creating a navigation map.

In some implementations, the navigation map 204 is stored externally. For example, a control unit or central server can store data representing a navigation map. A drone can receive signals which share one or more elements of the data representing a navigation map.

In general, a power source can be any device or part of a property capable of providing power. In some implementations, this can include power outlets (e.g., plugging a drone into a power outlet), power cords (e.g., a drone can draw power inductively from the current passing through the power cord using a copper coil), solar power (e.g., a drone can move in front of an unshaded window), or wireless chargers (e.g., a drone can navigate to a wireless charger and use a copper coil to draw power). In general, certain requirements can be used to restrict or enable use of one or more power sources. For example, a user can restrict the use of a wireless charger on a property such that a drone can only use the wireless charger if the drone is alone in the room where the wireless charger is located and an alarm system on the property is armed.

In some implementations, the drone 201 can communicate with an external source of data to inform actions. For example, the drone 201 can use a server to look up power source candidates. The drone 201 can find information about location, availability, restrictions, or other factors impacting the candidacy of a particular power source. The drone 201 can use data form the server to move to and use the particular power source.

In some implementations, the navigation map 204 can include more or less details. The exact elements of the navigation map can be interpreted in other forms. For example, matrices of certain values can be used to store data relevant to a property. The navigation map shown in item 204 is for illustrative purposes and is not necessarily how a property would be stored in a form of data storage.

Figure 3:
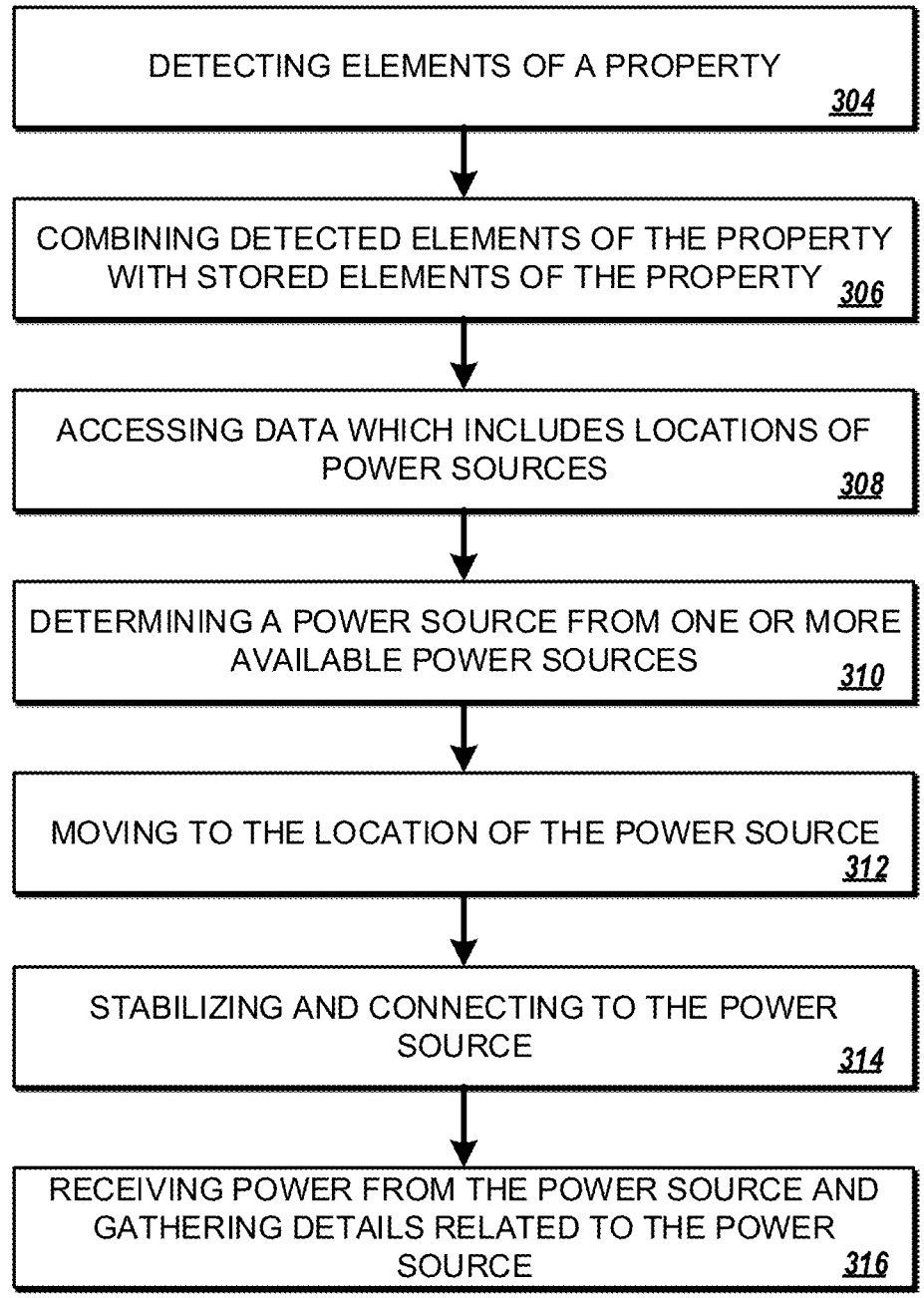
FIG. 3 is a flow diagram illustrating an example of a process for charging a base station-less drone.

FIG. 3 is a flow diagram illustrating an example of a process 300 for charging a base station-less drone. The process 300 may be performed by one or more electronic systems, for example, the system 100 of FIG. 1.

The process 300 includes detecting elements of a property (304). For example, the drone 103*a* detects the outlet 114. The action of detecting elements of a property can be instigated by sensor readings or alerts. For example, the drone 103*a* receives an alert form an onboard sensor that a battery is low as shown in item 105.

The process 300 includes combining detected elements of the property with stored elements of the property (306). For example, the drone 103*a* combines the detection of the outlet 114 element with the stored detected elements the lamp 112 and the cable 113. The drone 103*a* uses this combination to determine that the outlet 114 is active and a power source.

The process 300 includes accessing data that includes locations of power sources (308). For example, the drone 103*a* accesses a list of collected data that includes the living room outlet 114, a garage docking station, and a bedroom outlet. The garage docking station and the bedroom outlet are data retrieved from data storage. Depending on implementation, the data storage can be onboard the drone or stored remotely on a central server or control unit. The living room outlet 114 power source or any other power source detection, can be edited or amended in a list.

The process 300 includes identifying a power source from one or more available power sources (310). For example, the drone 103*a* sends a list of power source candidates 120 to the user smartphone 121. The drone 103*a* identifies a power source from one or more available power sources based on the feedback from the user smartphone 121. In this example, the living room outlet 114 is the identified power source.

The process 300 includes moving to the location of the power source (312). For example, the drone 103*a* uses aerial flying ability to move to the location of the living room outlet 114.

The process 300 includes stabilizing and connecting to the power source (314). For example, the drone 103b uses suction cups to attach to the wall that the outlet 114 is on. The drone 103b uses equipment including an accelerometer to inform the level of stability before connecting to the power source. The drone 103b uses a corresponding plug for the type of socket of the outlet 114.

The process 300 includes receiving power from the power source and gathering details related to the power source (316). For example, the drone 103b charges a battery onboard and receives details about its location and orientation by accessing stored information about the location of the outlet 114 and the known or calculated orientation of a drone connected to the outlet 114.

In some implementations, the availability or efficacy of the sources of power can be monitored. For example, a central server can collect data from one or more connected devices on a property to inform navigation and charging decisions for one or more drones or other devices operating on the property.

In some implementations, a drone can remove a candidate from a list of power source candidates. For example, if an outlet is a candidate on a list of power source candidates because it is active, unrestricted, and able to provide power to a drone, the drone, or another drone in a system, can investigate at any time to confirm the validity of the power source candidate. The drone can detect, for example, that a light which is plugged into the outlet is not producing light. In some cases, this can be sufficient for the drone to remove the outlet from a power source candidate list. The drone, in situations like this, can also send an alert to users at a property to inform that a power source is not available.

In some implementations, a drone can detect a source of power through external instructions or manipulation. For example, a user can plug a drone into an outlet in the bedroom. The drone can save the location in memory. If the drone requires power at some time after having been plugged into the outlet in the bedroom, the drone can recall the outlet in the bedroom as a power source candidate and navigate back to the location saved in memory for the outlet in the bedroom. The drone can consider multiple power source candidates before moving to a particular candidate for receiving power.

In some implementations, the drone can be specialized to work in a particular setting or region. For example, the drone can use different connectors or visual analysis techniques depending on the country in which the drone is operating. This can be advantageous in situations where one country uses one type of electrical plug and another country uses a different type of electrical plug. In some implementations, the drone can use an adaptable plug to fit more than one type of socket. For example, the drone can use a type of universal plug.

In some implementations, it may be advantageous for a drone to hide or move to a safe place if battery is low or the drone is in some sort of danger. The drone can wait and look for power sources after a danger is cleared or other detection is made. The drone can also send a distress signal to a server or a user. In some cases, the user can clear the danger or enable the drone to resume normal behavior and look for a power source if battery is low.

In some implementations, the drone can access power sources on a schedule. For example, in a given property, a power cord connects from an outlet to a washing machine. The washing machine is run on Saturdays, usually in the afternoon. A system can track the usages of devices or appliances within a property. The data can be used to inform decisions about power source usage. For example, in the given example, the system can inform a drone to use the power cord connected to the washing machine, in general, on Saturdays. A priority, or confidence value can be associated with a power source which can influence the usage of the power source within a system.

In some implementations, greater or fewer rationale can be used by a system to determine a priority of power sources. In some cases, priority can be overruled. For example, in cases where the user is given decision power, the highest priority power source need not be chosen. The highest priority can change depending on the environment, mission details, or elements of the system. Priorities can be updated as new information becomes available. For example, if a cable used to connect a washer to an outlet but now connects an alarm clock to the outlet, the system can change priority according to the decreased wattage now available at the cable for inductive charging.

Figure 4:
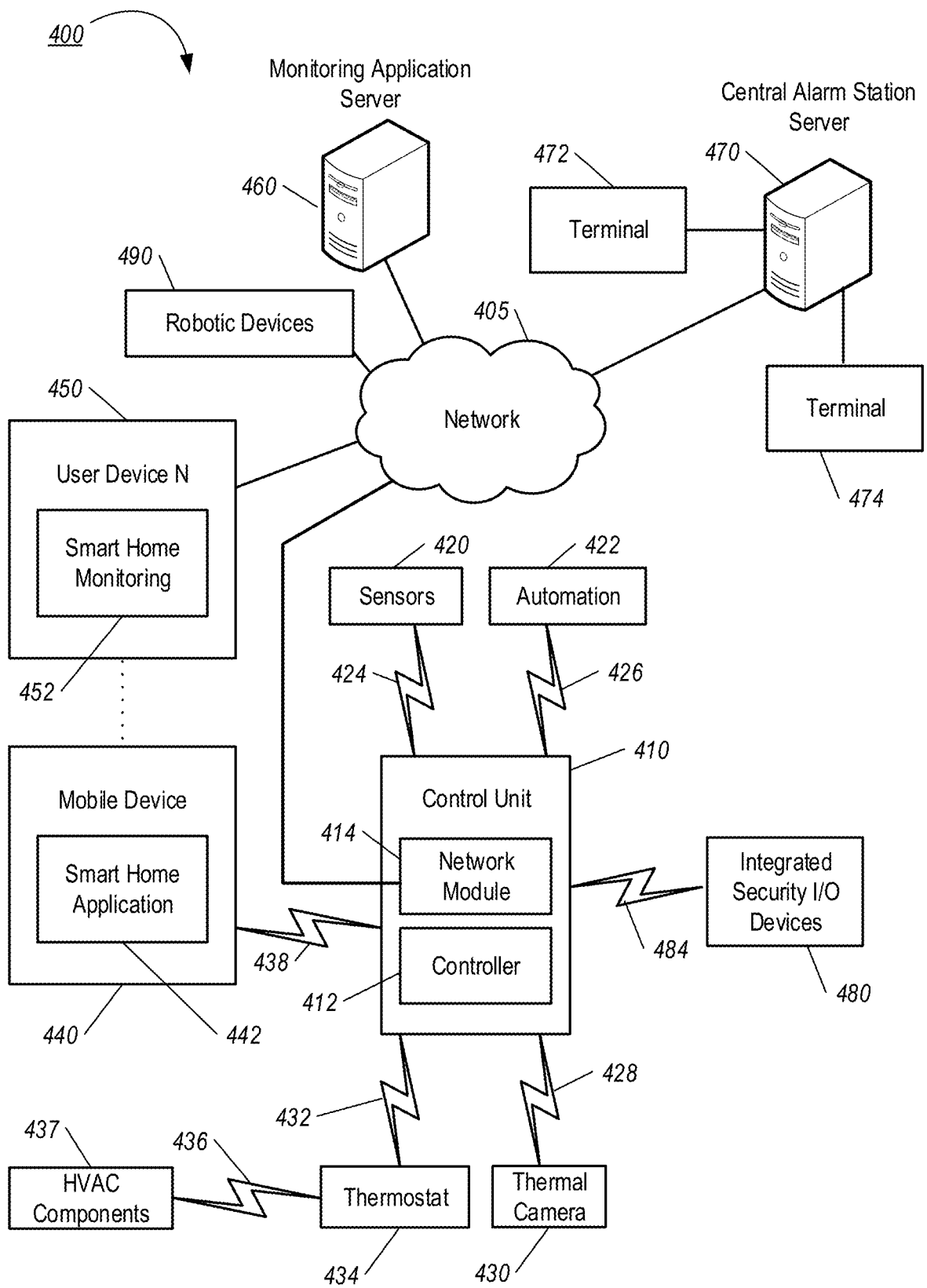
FIG. 4 is a diagram illustrating an example of a property monitoring system.

FIG. 4 is a diagram illustrating an example of a property monitoring system. The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors 420. For example, the monitoring system may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data.

The sensors 420 can also include a radio-frequency identification (RFID) sensor that identifies a particular article that includes a pre-assigned RFID tag.

The system 400 also includes one or more thermal cameras 430 that communicate with the control unit 410. The thermal camera 430 may be an IR camera or other type of thermal sensing device configured to capture thermal images of a scene. For instance, the thermal camera 430 may be configured to capture thermal images of an area within a building or home monitored by the control unit 410. The thermal camera 430 may be configured to capture single, static thermal images of the area and also video thermal images of the area in which multiple thermal images of the area are captured at a relatively high frequency (e.g., thirty images per second). The thermal camera 430 may be controlled based on commands received from the control unit 410. In some implementations, the thermal camera 430 can be an IR camera that captures thermal images by sensing radiated power in one or more IR spectral bands, including NIR, SWIR, MWIR, and/or LWIR spectral bands.

The thermal camera 430 may be triggered by several different types of techniques. For instance, a Passive Infra-Red (PIR) motion sensor may be built into the thermal camera 430 and used to trigger the thermal camera 430 to capture one or more thermal images when motion is detected. The thermal camera 430 also may include a microwave motion sensor built into the camera and used to trigger the thermal camera 430 to capture one or more thermal images when motion is detected. The thermal camera 430 may have a "normally open" or "normally closed" digital input that can trigger capture of one or more thermal images when external sensors (e.g., the sensors 420, PIR, door/window, etc.) detect motion or other events. In some implementations, the thermal camera 430 receives a command to capture an image when external devices detect motion or another potential alarm event. The thermal camera 430 may receive the command from the controller 412 or directly from one of the sensors 420.

In some examples, the thermal camera 430 triggers integrated or external illuminators (e.g., Infra-Red or other lights controlled by the property automation controls 422, etc.) to improve image quality. An integrated or separate light sensor may be used to determine if illumination is desired and may result in increased image quality.

The thermal camera 430 may be programmed with any combination of time/day schedules, monitoring system status (e.g., "armed stay," "armed away," "unarmed"), or other variables to determine whether images should be captured or not when triggers occur. The thermal camera 430 may enter a low-power mode when not capturing images. In this case, the thermal camera 430 may wake periodically to check for inbound messages from the controller 412. The thermal camera 430 may be powered by internal, replaceable batteries if located remotely from the control unit 410. The thermal camera 430 may employ a small solar cell to recharge the battery when light is available. Alternatively, the thermal camera 430 may be powered by the controller's 412 power supply if the thermal camera 430 is co-located with the controller 412.

In some implementations, the thermal camera 430 communicates directly with the monitoring server 460 over the Internet. In these implementations, thermal image data captured by the thermal camera 430 does not pass through the control unit 410 and the thermal camera 430 receives commands related to operation from the monitoring server 460.

In some implementations, the system 400 includes one or more visible light cameras, which can operate similarly to the thermal camera 430, but detect light energy in the visible wavelength spectral bands. The one or more visible light cameras can perform various operations and functions within the property monitoring system 400. For example, the visible light cameras can capture images of one or more areas of the property, which the cameras, the control unit, and/or another computer system of the monitoring system 400 can process and analyze.

The system 400 also includes one or more property automation controls 422 that communicate with the control unit to perform monitoring. The property automation controls 422 are connected to one or more devices connected to the system 400 and enable automation of actions at the property. For instance, the property automation controls 422 may be connected to one or more lighting systems and may be configured to control operation of the one or more lighting systems. Also, the property automation controls 422 may be connected to one or more electronic locks at the property and may be configured to control operation of the one or more electronic locks (e.g., control Z-Wave locks using wireless communications in the Z-Wave protocol). Further, the property automation controls 422 may be connected to one or more appliances at the property and may be configured to control operation of the one or more appliances. The property automation controls 422 may include multiple modules that are each specific to the type of device being controlled in an automated manner. The property automation controls 422 may control the one or more devices based on commands received from the control unit 410. For instance, the property automation controls 422 may interrupt power delivery to a particular outlet of the property or induce movement of a smart window shade of the property.

The system 400 also includes thermostat 434 to perform dynamic environmental control at the property. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at the property and/or environmental data at the home, e.g., at various locations indoors and outdoors at the property. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more property automation controls 422.

In some implementations, a module 437 is connected to one or more components of an HVAC system associated with the property, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robot that are capable of moving and taking actions that assist in home monitoring. For example, the robotic devices 490 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and/or roll along the ground, walls, or ceiling) and land vehicle type devices (e.g., automated cars that drive around a property). In some cases, the robotic devices 490 may be robotic devices 490 that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a property. In these examples, the robotic devices 490 include sensors and control processors that guide movement of the robotic devices 490 within the property. For instance, the robotic devices 490 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the property and guide movement of the robotic devices 490 in a manner that avoids the walls and other obstacles.

In addition, the robotic devices 490 may store data that describes attributes of the property. For instance, the robotic devices 490 may store a floorplan of a building on the property and/or a three-dimensional model of the property that enables the robotic devices 490 to navigate the property. During initial configuration, the robotic devices 490 may receive the data describing attributes of the property, determine a frame of reference to the data (e.g., a property or reference location in the property), and navigate the property based on the frame of reference and the data describing attributes of the property. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users at the property. The one or more biometric data collection tools may be configured to collect biometric samples of a person in the property with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, one or more of the thermal cameras 430 may be mounted on one or more of the robotic devices 490.

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the property. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the property. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid state electronic storage that enables the robotic devices 490 to store applications, configuration data, collected sensor data, and/or any other type of information available to the robotic devices 490.

The robotic devices 490 can be associated with one or more charging stations. The charging stations may be located at predefined home base or reference locations at the property. The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact-based charging stations and/or wireless charging stations. For contact-based charging stations, the robotic devices 490 may have readily accessible points of contact that the robotic devices 490 are capable of positioning and mating with a corresponding contact on the charging station. For instance, a helicopter type robotic device 490 may have an electronic contact on a portion of its landing gear that rests on and mates with an electronic pad of a charging station when the helicopter type robotic device 490 lands on the charging station. The electronic contact on the robotic device 490 may include a cover that opens to expose the electronic contact when the robotic device 490 is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the property may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device 490 may always use a first charging station and a second robotic device 490 may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the property that is not associated with a charger. The number of community charging stations may be less than the number of robotic devices 490.

Also, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device 490 to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the property automation controls 422, the thermal camera 430, the thermostat 434, and the integrated security devices 480 may communicate with the controller 412 over communication links 424, 426, 428, 432, and 484. The communication links 424, 426, 428, 432, and 484 may be a wired or wireless data pathway configured to transmit signals from the sensors 420, the property automation controls 422, the thermal camera 430, the thermostat 434, and the integrated security devices 480 to the controller 412. The sensors 420, the property automation controls 422, the thermal camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, and 484 may include a local network. The sensors 420, the property automation controls 422, the thermal camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 4 (CAT5) or Category 6 (CAT6) wired Ethernet network. The local network may be a mesh network constructed based on the devices connected to the mesh network.

The monitoring server 460 is one or more electronic devices configured to provide monitoring services by exchanging electronic communications with the control unit 410, the one or more user devices 440 and 450, and the central alarm station server 470 over the network 405. For example, the monitoring server 460 may be configured to monitor events (e.g., alarm events) generated by the control unit 410. In this example, the monitoring server 460 may exchange electronic communications with the network module 414 included in the control unit 410 to receive information regarding events (e.g., alerts) detected by the control unit 410. The monitoring server 460 also may receive information regarding events (e.g., alerts) from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor data, thermal image data, and other monitoring system data received from the monitoring system and perform analysis of the sensor data, thermal image data, and other monitoring system data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, thermal image, and other data to determine an activity pattern of a resident of the property monitored by the system 400. In some implementations, the monitoring server 460 may analyze the data for alarm conditions or may determine and perform actions at the property by issuing commands to one or more of the automation controls 422, possibly through the control unit 410.

The central alarm station server 470 is an electronic device configured to provide alarm monitoring service by exchanging communications with the control unit 410, the one or more mobile devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more mobile devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the smart home application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a smart home application 442. The smart home application 442 refers to a software/firmware program running on the corresponding mobile device that enables the user interface and features described throughout. The user device 440 may load or install the smart home application 442 based on data received over a network or data received from local media. The smart home application 442 runs on mobile devices platforms, such as iPhone, iPod touch, Blackberry, Google Android, Windows Mobile, etc. The smart home application 442 enables the user device 440 to receive and process image and sensor data from the monitoring system.

The user device 450 may be a general-purpose computer (e.g., a desktop personal computer, a workstation, or a laptop computer) that is configured to communicate with the monitoring server 460 and/or the control unit 410 over the network 405. The user device 450 may be configured to display a smart home user interface 452 that is generated by the user device 450 or generated by the monitoring server 460. For example, the user device 450 may be configured to display a user interface (e.g., a web page) provided by the monitoring server 460 that enables a user to perceive images captured by the thermal camera 430 and/or reports related to the monitoring system. Although FIG. 4 illustrates two user devices for brevity, actual implementations may include more (and, perhaps, many more) or fewer user devices.

The smart home application 442 and the smart home user interface 452 can allow a user to interface with the property monitoring system 400, for example, allowing the user to view monitoring system settings, adjust monitoring system parameters, customize monitoring system rules, and receive and view monitoring system messages.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors 420 and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system 400.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the property automation controls 422, the thermal camera 430, and the robotic devices 490. The one or more user devices 440 and 450 receive data directly from the sensors 420, the property automation controls 422, the thermal camera 430, and the robotic devices 490 (i.e., the monitoring system components) and sends data directly to the monitoring system components. The one or more user devices 440, 450 provide the appropriate interfaces/processing to provide visual surveillance and reporting.

In other implementations, the system 400 further includes network 405 and the sensors 420, the property automation controls 422, the thermal camera 430, the thermostat 434, and the robotic devices 49 are configured to communicate sensor and image data to the one or more user devices 440 and 450 over network 405 (e.g., the Internet, cellular network, etc.). In yet another implementation, the sensors 420, the property automation controls 422, the thermal camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the property automation controls 422, the thermal camera 430, the thermostat 434, and the robotic devices 490 to a pathway over network 405 when the one or more user devices 440 and 450 are farther from the sensors 420, the property automation controls 422, the thermal camera 430, the thermostat 434, and the robotic devices 490. In some examples, the system leverages GPS information from the one or more user devices 440 and 450 to determine whether the one or more user devices 440 and 450 are close enough to the monitoring system components to use the direct local pathway or whether the one or more user devices 440 and 450 are far enough from the monitoring system components that the pathway over network 405 is required. In other examples, the system leverages status communications (e.g., pinging) between the one or more user devices 440 and 450 and the sensors 420, the property automation controls 422, the thermal camera 430, the thermostat 434, and the robotic devices 490 to determine whether communication using the direct local pathway is possible. If communication using the direct local pathway is possible, the one or more user devices 440 and 450 communicate with the sensors 420, the property automation controls 422, the thermal camera 430, the thermostat 434, and the robotic devices 490 using the direct local pathway. If communication using the direct local pathway is not possible, the one or more user devices 440 and 450 communicate with the monitoring system components using the pathway over network 405.

In some implementations, the system 400 provides end users with access to thermal images captured by the thermal camera 430 to aid in decision making. The system 400 may transmit the thermal images captured by the thermal camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the thermal camera 430 or other cameras of the system 400). In these implementations, the thermal camera 430 may be set to capture thermal images on a periodic basis when the alarm system is armed in an "armed away" state, but set not to capture images when the alarm system is armed in an "armed stay" or "unarmed" state. In addition, the thermal camera 430 may be triggered to begin capturing thermal images when the alarm system detects an event, such as an alarm event, a door-opening event for a door that leads to an area within a field of view of the thermal camera 430, or motion in the area within the field of view of the thermal camera 430. In other implementations, the thermal camera 430 may capture images continuously, but the captured images may be stored or transmitted over a network when needed.

Figure 5:
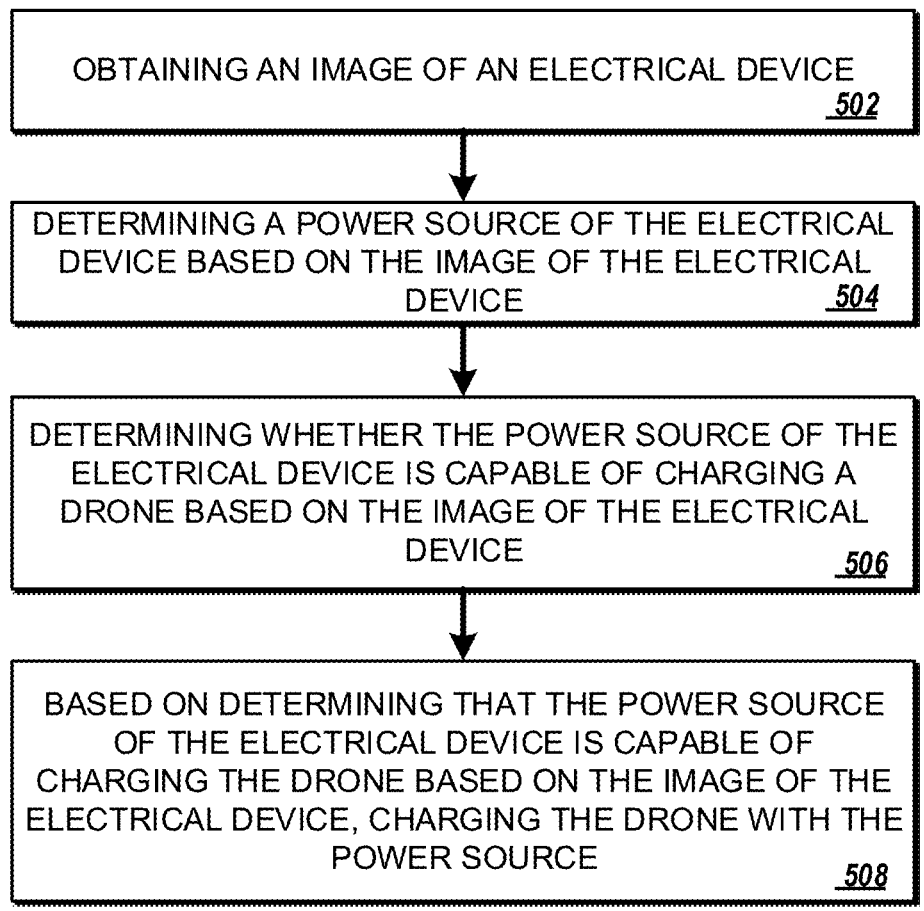
FIG. 5 is a flow diagram illustrating an example of a process for charging a base station-less drone.

FIG. 5 is a flow diagram illustrating an example of a process 500 for charging a base station-less drone. The process 500 may be performed by one or more electronic systems, for example, the system 100 of FIG. 1 or the system 400 of FIG. 4. In some implementations, one or more actions included in the process 500 are performed by a drone such as the drone 103 of FIG. 1. In some implementations, one or more actions included in the process 500 are performed by a control unit such as the control unit 410.

The process 500 includes obtaining an image of an electrical device (502). For example, the drone 103a can use at least one visual sensor onboard to detect the lamp 112. In some implementations, the drone 103a may be equipped with a camera that is used to detect the lamp 112. In some implementations, other electrical devices may be detected by the drone 103a. In general, any device that uses electricity can be considered an electrical device that may be detected by a given drone such as the drone 103a.

In some implementations, a drone determines a charge level of the drone. For example, the drone can determine a charge level of the drone before or after obtaining the image of the electrical device as discussed in action 502 of the example process 500. The drone can determine that a current charge level of the drone is below a predetermined charge level and, in response to determining the current charge level of the drone is below the predetermined charge level, the drone can obtain information of the electrical device. The information of the electrical device can include one or more images of, or a location corresponding to, the electrical device or the power source associated with the electrical device from onboard memory or an external entity. The drone can similarly determine a particular power source as a candidate for charging before a current charge level is below a predetermined charge level and, when the current charge level drops below the predetermined charge level, use the previously determined power source for charging the drone. For example, the drone can store a location of the power source and navigate back to the power source for charging as needed.

The process 500 includes determining a power source of the electrical device based on the image of the electrical device (504). For example, the drone 103a can detect elements within the field of view 106. In general, a field of view may include any number or types of elements. In the example of FIG. 1, the field of view 106 includes the lamp 112, the living room outlet 114, and the power cord 113. Based on the image of the lamp 112, the drone 103a determines the power source of the lamp 112. Specifically, the drone 103a detects each element within the field of view 106 and determines, based on an association of elements within the field of view 106, a power source of the lamp 112. For example, the drone 103a determines that the power cord 113 is plugged into the living room outlet 114 using visual analysis methods. The drone 103a further determines that the lamp 112 is producing light. By combining the determinations based on the image data from the field of view 106, the drone 103a can determine the power source of the lamp 112 is the living room outlet 114.

The process 500 includes determining whether the power source of the electrical device is capable of charging a drone based on the image of the electrical device (506). For example, the drone 103a can determine if a power source is available. In some cases, determining if the power source is available includes determining a socket of the living room outlet 114 is not occupied. If the power source is available, the drone 103a can determine the living room outlet 114 is capable of charging the drone 103a. In some implementations, the drone may determine a charging mechanism of the drone. For example, the drone can determine a charging mechanism of the drone and determine, based on the charging mechanism and a given power source, whether the power source is capable of charging the drone.

In some implementations, the drone determines whether the power source of the electrical device is capable of charging the drone based on one or more elements of the image of the electrical device. For example, the drone 103a can capture one or more images that include the lamp 112 and determine, based on light emitted from the lamp 112, that the power source of the lamp 112 is capable of charging the drone. In some cases, an indication of electrical activity in an electrical device is sufficient for a drone to determine that a power source corresponding to the electrical device is capable of providing a charge and therefore charging the drone. For example, an indication of electrical activity can include an emission of light, movement, sound, a current time in reference to a predetermined schedule, or a broadcasted signal received by the drone.

The process 500 includes, based on determining that the power source of the electrical device is capable of charging the drone based on the image of the electrical device, charging the drone with the power source (508). For example, the drone 103a is depicted in a new location as the drone 103b and charges using the living room outlet 114. The drone 103b may use a plug or other conductive element to draw electricity from the power source to the drone 103b.

In some implementations, a drone may determine features of a power source of an electrical device. For example, the drone may receive a power output value from a device on a network or from a stored database of power outputs corresponding to a number of power sources. In some implementations, the drone may compare features of the power source to required features for charging the drone. For example, the drone can compare the power output corresponding to the electrical device with a required power for charging the drone to determine if the power source is capable of charging the drone.

In some implementations, before charging the drone with the power source, the drone checks availability of the power source. For example, the drone can obtain an image of the power source of the electrical device and determine, based on the image of the power source, that the power source is available. In some cases, available includes determining that a socket of an outlet is not occupied. In some cases, available includes determining that a power cord used for inductive charging is free from obstruction to enable the drone to get close enough for the drone to receive an inductive charge.

In some implementations, the drone generates a power source candidate list. For example, the drone can generate a power source candidate list that includes the power source corresponding to the electrical device. In some cases, an alarm condition of a property may be used to update the power source candidate list. For example, if an alarm condition is set to armed, a drone may change a priority of the power source candidate list to prioritize power sources that are inside as opposed to outside. In some cases, a user may provide preferences for how the drone should adjust the power source candidate list in response to an alarm condition.

In some implementations, the drone generates a power source candidate list. For example, the drone can generate a power source candidate list that includes the power source and another power source. The drone can determine a set of priority factors for each power source in the power source candidate list. The priority factors can include location, power output, user charging preferences (e.g., not charging when a user is in the same room, only charging at certain times, among others), projected user traffic in an area within a predetermined distance from the given power source or within the same room, among others. The drone can use the priority factors generated for each power source to determine a priority for the power sources of the power source candidate list where the priority represents a preference to charge using one power source over another.

In some implementations, the drone generates a power source candidate list. For example, the drone can generate a power source candidate list that includes the power source and can send the power source candidate list to a user device, such as a smartphone. A user can receive the candidate list and select which power source the drone should use for charging. In some implementations, the user can set a preference such that the drone determines, based on the preferences and without sending a list to the user, a preferred charging location. The drone can then charge using the preferred charging location. In some implementations, the drone receives input from the user in response to sending the power source candidate list to the user device. For example, the drone can obtain the feedback data corresponding to the user's decision and then charge the drone accordingly to the selection of the user. In some implementations, the drone does not receive input from the user in response to sending the power source candidate list to the user device. The drone can set a timeout period after which a determined action is performed. The drone can determine a time elapsed from a time when the drone sends the request to the user device to a later time to determine if the timeout period has been reached.

In some implementations, the drone generates a power source candidate list. For example, the drone can generate a power source candidate list that includes the power source and can send the power source candidate list to an external database, such as a network server. The network server can store power source candidates from one or more drones and use the provided data to assemble a master power source candidate list that combines received power source candidate lists. The master power source candidate list can then be provided to one or more devices of the network and be used by the one or more devices to inform charging decisions. The devices can continue to provide feedback and the server, or processor operating on data stored in the server, can update the master power source candidate list in response to receiving updates from the devices, such as the drone.

In some implementations, the drone may determine a route plan based on the power source. For example, the drone can obtain one or more images of one or more power sources. The drone can store the locations of the one or more power sources. When planning a route at a property, the drone can reference the locations of the one or more power sources. For example, the drone can plan a route to make sure that a power source capable of charging the drone is nearby at certain stages of a journey. In some implementations, when storing information of the power sources, the drone can also store positions of the drone. For example, the drone can store positions of the drone when charging with a particular power source or on approach to the power source in order to aid in subsequent charging, by the drone or another device in the network, with the given power source. The drone, or another device in the network, can use the stored positions as a reference for how to move or what position to be in when charging using the power source.

In some implementations, a component communicably connected to the drone may perform actions described in FIG. 5. For example, a control unit can obtain a power source candidate list that includes the power source of the electrical device. The control unit can determine which power source candidate the drone is to charge with. For example, the control unit can determine, based on a location of a drone, the nearest power source candidate to the drone as the power source candidate the drone is to charge with. The control unit can send a signal to the drone to navigate to the location of the determined power source candidate. The control unit can send a signal to the drone to capture one or more images of the determined power source candidate to ensure that the determined power source candidate is on and capable of charging the drone. For example, for power sources that are currently powering and connected to a light, the drone can detect whether or not the connected light is emitting light.

In some implementations, the drone may process captured images onboard. In some implementations, the drone may send images to a communicably connected component for processing. Either the drone or the communicably connected component, such as a control unit, depending on implementation, may determine that a determined power source candidate is capable of providing a charge. Once either the drone or the control unit determines that the determined power source candidate is capable of providing a charge, the drone can charge using the determined power source candidate. For example, the control unit can determine, based on images captured by the drone, that the determined power source candidate is capable of charging the drone. In response to determining the determined power source candidate is capable of charging the drone, the control unit can send a signal configured to instruct the drone to charge using the determined power source candidate. In some implementations, a control unit may determine an outlet is a power source candidate capable of charging a drone based on determining that the outlet is connected to a powered electrical device and includes at least one open socket.

In some implementations, an electrical device may be a user device. For example, the electrical device can be a smartphone that sends data to a network when the smartphone is charging. The smartphone can send details to the network about the power source used to charge the smartphone. A drone can obtain the information corresponding to the details sent by the smartphone and use the information to determine where to charge or whether or not to charge using a determined power source.

In some implementations, the drone obtains a power schedule for one or more devices at a property. The drone can use the power schedule to inform charging determinations. For example, the drone can obtain a power schedule that specifies a specific time during which an electrical device will be powered on. The drone can then use the power schedule as a reference to determine if a given power source will be available as a power source based on whether or not the power schedule indicates that electricity will be flowing to the electrical device. For example, a power schedule can include a time when a washing machine will be used. The drone can use the cable connecting the washing machine to an outlet for inductive charging when, based on the power schedule or other factors determined by the drone, the drone determines that the power cord of the washing machine will be able to charge the drone.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random-access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
obtaining an image of an electrical device;
determining a power source of the electrical device based on the image of the electrical device;
determining a power output of the power source of the electrical device;
determining whether the power source of the electrical device is capable of charging a drone based on the image of the electrical device, wherein determining whether the power source of the electrical device is capable of charging the drone comprises determining whether the power output of the power source of the electrical device satisfies a power requirement for charging the drone; and
based on determining that the power source of the electrical device is capable of charging the drone based on the image of the electrical device, charging the drone with the power source.

2. The method of claim 1, further comprising:
determining a current charge level of the drone is below a predetermined charge level; and
in response to determining the current charge level of the drone is below the predetermined charge level, obtaining information of the electrical device.

3. The method of claim 2, wherein the information of the electrical device comprises a location of the electrical device, and the method comprises:
determining, using the information, a route from a first location for the drone to the location of the electrical device.

4. The method of claim 1, further comprising:
in response to determining the power source of the electrical device, storing information corresponding to the power source in data storage;
after storing the information corresponding to the power source in the data storage, determining a current charge level of the drone is below a predetermined charge level;
in response to determining the current charge level of the drone is below the predetermined charge level, obtaining the information corresponding to the power source from the data storage; and
charging the drone with the power source based on the information corresponding to the power source stored in the data storage.

5. The method of claim 4, before charging the drone with the power source, further comprising:
obtaining a second image of the power source of the electrical device; and
determining, based on the second image of the power source, the power source is available.

6. The method of claim 1, further comprising:
generating a power source candidate list that comprises the power source;
receiving information that indicates an alarm condition of a property, wherein the electrical device is at the property; and
updating the power source candidate list based on the alarm condition.

7. The method of claim 1, wherein determining that the power source of the electrical device is capable of charging the drone comprises:
determining whether the power source of the electrical device is available; and
based on determining the power source of the electrical device is available, determining that the power source of the electrical device is capable of charging the drone.

8. The method of claim 1, wherein determining that the power source of the electrical device is capable of charging the drone comprises:
determining a charging mechanism of the drone is compatible with the power source of the electrical device.

9. The method of claim 1, wherein the electrical device is a user device and the method further comprises:

obtaining, from the user device, information of the power source comprising charging data that indicates a location of the power source used for charging the user device.

10. The method of claim 1, further comprising:
determining another power source as a second power source;
determining a first set of priority factors for the power source;
determining a second set of priority factors for the second power source;
based on the first set of priority factors and the second set of priority factors, generating a first priority factor for the power source and a second priority factor for the second power source; and
charging the drone with the power source based on a comparison of the first priority factor and the second priority factor.

11. The method of claim 1, further comprising:
determining a route plan based on a location corresponding to the power source.

12. The method of claim 1, further comprising:
maintaining information of the power source, wherein the information of the power source comprises a charging position of the drone when charging with the power source; and
updating, using the information of the power source, an estimated position of the drone with the charging position.

13. The method of claim 1, further comprising:
obtaining a power schedule for one or more electrical devices of a property, wherein the one or more electrical devices comprise the electrical device; and
determining that the power source of the electrical device is capable of charging the drone based on the power schedule for the one or more electrical devices.

14. The method of claim 1, wherein charging the drone with the power source comprises:
charging the drone by induction from electrical charges moving in a power cable of the electrical device, wherein the power cable of the electrical device is the power source of the electrical device.

15. The method of claim 1, further comprising:
providing a list of power source candidates to a user device, wherein the list of power source candidates comprises information of the power source;
receiving data corresponding to the information of the power source from the user device; and
based on receiving the data, charging the drone with the power source.

16. The method of claim 1, further comprising:
providing a list of power source candidates to a user device at a first time, wherein the list of power source candidates comprises information of the power source;
obtaining a timeout period, wherein the timeout period is an amount of time;
determining that an amount of time from the first time to a current time satisfies the timeout period; and
based on determining that the amount of time from the first time to the current time satisfies the timeout period, charging the drone with the power source.

17. The method of claim 1, further comprising:
providing a list of power source candidates to an external database, wherein the list of power source candidates comprises information of the power source.

18. A system comprising one or more computers and one or more storage devices on which are stored instructions that are operable, when executed by the one or more computers, to cause the one or more computers to perform operations comprising:
obtaining an image of an electrical device;
determining a power source of the electrical device based on the image of the electrical device;
determining a power output of the power source of the electrical device;
determining whether the power source of the electrical device is capable of charging a drone based on the image of the electrical device, wherein determining whether the power source of the electrical device is capable of charging the drone comprises determining whether the power output of the power source of the electrical device satisfies a power requirement for charging the drone; and
based on determining that the power source of the electrical device is capable of charging the drone based on the image of the electrical device, charging the drone with the power source.

19. A non-transitory computer storage medium encoded with instructions that, when executed by one or more computers, cause the one or more computers to perform operations comprising:
obtaining an image of an electrical device;
determining a power source of the electrical device based on the image of the electrical device;
determining a power output of the power source of the electrical device;
determining whether the power source of the electrical device is capable of charging a drone based on the image of the electrical device, wherein determining whether the power source of the electrical device is capable of charging the drone comprises determining whether the power output of the power source of the electrical device satisfies a power requirement for charging the drone; and
based on determining that the power source of the electrical device is capable of charging the drone based on the image of the electrical device, charging the drone with the power source.

* * * * *